Dec. 30, 1924.

J. P. BALDWIN
SLIDING CLUTCH
Filed July 22, 1918

Witness
C. C. Holly.

Inventor
James Pierce Baldwin
by James R. Townsend
his atty.

Dec. 30, 1924.

J. P. BALDWIN 1,521,588

SLIDING CLUTCH

Filed July 22, 1918

Witness
C. C. Holly

Inventor
James Pierce Baldwin

Patented Dec. 30, 1924.

1,521,588

UNITED STATES PATENT OFFICE.

JAMES PIERCE BALDWIN, OF LOS ANGELES, CALIFORNIA.

SLIDING CLUTCH.

Application filed July 22, 1918. Serial No. 246,468.

*To all whom it may concern:*

Be it known that I, JAMES PIERCE BALDWIN, a citizen of the United States, residing at Los Angeles, in the county of Los Angeles and State of California, have invented a new and useful Sliding Clutch, of which the following is a specification.

This invention relates to running friction clutches adapted for use as spring dampers on automobiles and relates more particularly to that type of damper which uses moving struts for actuating the friction mechanism.

It is distinguished from such running clutches as are designed for substantially unyielding engagement; and in order to more clearly define its character, I have termed it a sliding clutch. It is entirely foreign to stationary clutches which are clutches that function equally in both directions of movement.

Heretofore, when running clutches, that is, clutches functioning in but one direction of movement, and substantially unyielding in this one direction, have been used as spring dampers, it has been necessary to provide delicate adjustments or to fit such clutches with resilient members, so that the clutch will offer the desired yielding resistance; and an object of this invention is to so construct a running friction clutch that it will offer the desired yielding resistance to movement of the spring, without the use of such resilient members and without delicate adjustments.

Other objects, advantages and features of invention will appear from the accompanying drawings, the subjoined detailed description and appended claims.

I have illustrated in the drawings forming a part of this application, the type of clutch employing an annular ring and curved friction brake shoes; but my invention applies to all types of sliding clutches employing moving strut actuating means.

In the drawings, Figs. 1, 2, 3 and 4 serve to illustrate two methods of attaching the device to an automobile.

Fig. 5 is an enlarged fragmental elevation of the clutch shown in Fig. 3, a portion of the case being omitted to expose the interior construction.

In Figs. 7 and 8 an exaggerated comparison of the released or inoperative position with the engaged or operative position, is made. Feathered and plain arrows respectively illustrate the clutching and releasing movements of the annulus.

In Figs. 9 and 10 the contact lines $c$, $d$, $e$, $f$, of the shoe and the outer end of the strut and of the abutment and the inner end of the strut, are shown as though the elements were separated and turned over to expose the contacting lines in parallelism with each other, so that the relative shifting of the contacting lines at top and bottom of the strut imposed by engaging and releasing and by changes in the friction faces through wear and compression, may be noted in Fig. 10 when compared to Fig. 9.

Figures 1, 2, 3, 4, 5:
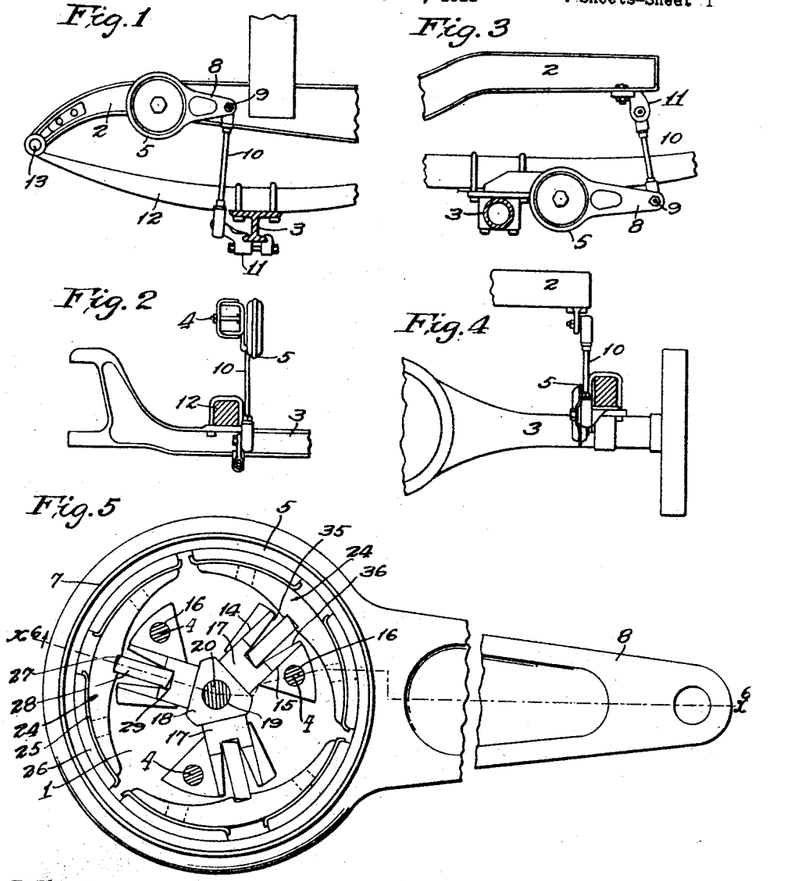
Figure 6:
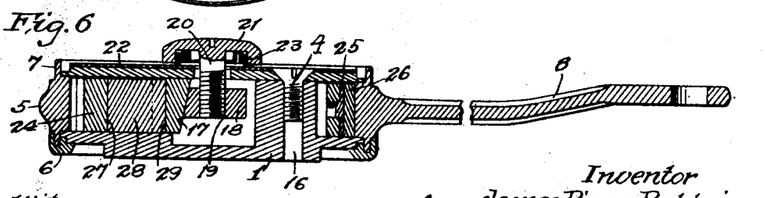
Fig. 6 is a section on line $x$—6, Fig. 5.

Referring to the drawings in detail; the base 1 in Figs. 5 and 6, is adapted for attachment to one of the yieldingly separated members 2, 3, of the chassis by means of the bolts 44. The annulus 5 is journaled between the base and the cover-plate 22 by means of the extensions 6 and 7 of the annulus. 66 is a finish ring pressed onto extension 6. Said annulus is provided with an arm 8 adapted for attachment by a pin 9 and a connecting rod 10 with a clip 11 by which the arm may be connected to a body that is the complement of the body to which the base 1 is attached. The spring 12 is connected to the chassis 2 by any suitable means as by a joint 13 in the usual way. The base is provided with ways having side walls 14 and 15 parallel to a center line radiating from the center of revolution. One of the side walls of each way is enlarged to form a post which is provided with a threaded hole 16 for the attachment of the cover-plate 22 on the outer side by screws 4, and the attachment of the base to the vehicle on the inner side by bolts 44.

Adjustable floating strut abutments 17 are provided for the inner ends of the ways and are adapted to move therealong when acted upon by the triangular shaped expanding block 18 having three tapered flat sides and which is provided with a centrally threaded orifice 19 to receive the adjusting screw 20 that has a head 21 outside the cover-plate member 22; the expanding block being subject to the pressure of the spring 23 which serves to maintain a snug contact between the working parts.

Brake shoe beams 24 having metal backings 25 and facings 26 of leather or other suitable material for engaging the inner wall of the annulus 5 are provided with recessed seats 27 to accommodate the outer ends of the non-resilient struts 28, the inner ends of which are accommodated by companion recessed seats 29 in the abutments 17.

In the preferred form, the struts are of rigid relatively thin material, and the length of the strut is approximately equal to three and one-half times its thickness; that is to say, the distance between the bearing points on the respective ends of the strut is approximately not less than three and one-half times the length of the chord subtending the cam faced or curved strut ends. The radii for said curves are so proportioned that no projection of either of said curves will form a closed curve with the other of said curves. The contacting lines 33 and 34 of the strut are on opposite sides of the radial lines $o$, $b''$ and $o'$, $b'$, which pass through the center of the strut at $k'$ and $k''$. In order to produce a substantially unchanging angle of thrust, the bearing surfaces must be of such curvature that the length of the succeeding radii between the simultaneously contacting lines of the strut, must increase or decrease according to the direction of movement of the strut, and must increase or decrease in length in direct proportion to the magnitude of such movement; that is to say, for each increment of movement, for example, ten one-thousandths of an inch in the moving strut, there must be a proportionate increment, say, one-thousandth of an inch of separation or of approach between the parts that are separated by the moving strut. In laying out my struts, I therefore use substantially involute curves 30 and 31, developed from a predetermined circle 32 for determining the proper curvature of the ends of my struts; but other curves or combinations may be used to arrive at this result and would come within the purview of this invention. In other words, various forms of cam faces may be so constructed with relation to the required length of moving strut, or to the planes or curves on which such faces articulate, or to both the requisite length and such planes or curves, whereby the mathematical equivalent of an involute face articulating on a flat surface may be readily obtained. Owing to the very limited oscillation of the moving struts in the form of device shown in the drawings, the actual arcs of articulation are very short; and therefore it is possible to obtain substantially the same mathematical and mechanical results by curving the articulating portions of the ends of the struts in other ways provided the objects of the invention are realized. In other words, when true involute curves are used for the bearing ends of the struts, the contacting arcs of such ends are so minute in extent that there is practically no difference in the length of the radii for the respective ends of such minute contracting arcs.

Thus while it is of advantage to use involutes, particularly in laying out a certain construction of strut to meet certain requirements; it is practicable, by employing other arcs of the proper degree of curvature, to construct struts with ends which will correspond so closely to true involutes, in so far as the actual contacting arcs are concerned, that they will function substantially in the same manner as if the entire ends had been constructed to conform to the predetermined involutes indicated by the layout for the actual contacting arcs. It is not necessary to have both ends of the strut provided with substantially involute curves;

and an object of this invention may be attained by any such a combination of curves as will produce a substantially constant angle of thrust.

Figures 11, 12:
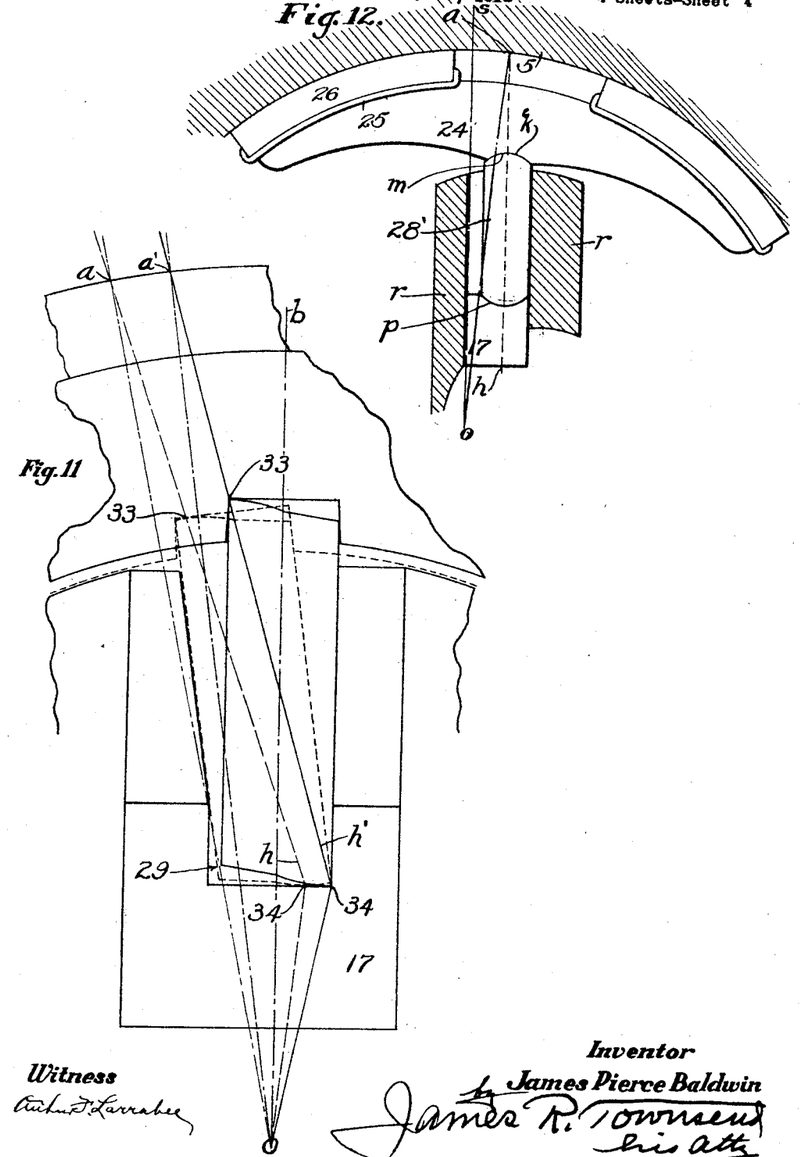
Fig. 11 is a view of a form of the invention wherein the angle of thrust is greater than in the form shown in the preceding views, thus producing less frictional resistance between the brake shoes and the annulus. In this view, the involute faces extend only throughout the surfaces adapted for articulation and for compensation for wear and compression.
Fig. 12 is a view of a non-compensating form in which the angle of thrust is not substantially constant but in which this angle is prevented from approximating zero in relation to a normal to the brake face, by means of a stop with which the strut contacts.

For example, a strut with a circular curve $h$ at the outer end and articulating in a circular recess $m$ in the shoe, as shown in Fig. 12, may be provided with an articulation $p$, at the inner end that will serve some of the purposes of this invention.

Figure 7:
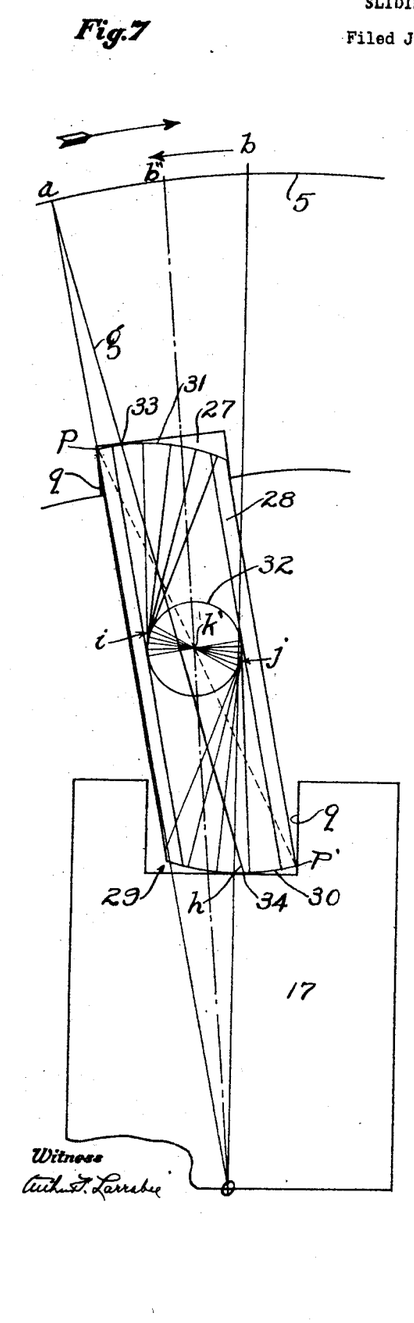
Fig. 7 is a fragmental diagrammatic view, on a greatly enlarged scale, of one of my improved moving struts and some of the parts cooperating therewith as shown in Fig. 5. Construction lines are shown which serve to illustrate a simple method of laying out the curves for the contact faces of the improved strut in such a manner as to satisfactorily accomplish the purpose of this invention. The strut is here illustrated as being in the extreme released position; that is, in contact with the resilient release stop 35 shown in Fig. 5.
Figure 8:
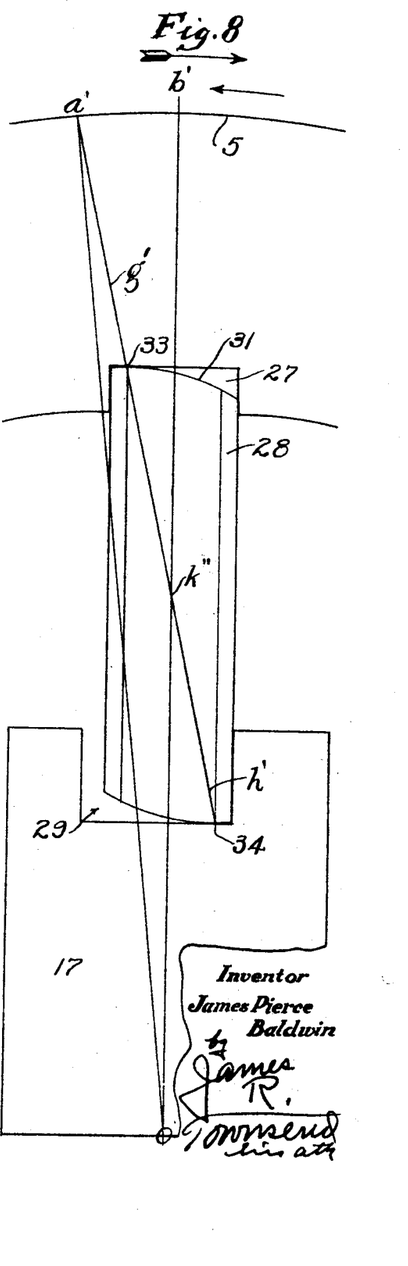
Fig. 8 is a view analogous to Fig. 7 showing the equivalent position of the parts when the struts are in a fully engaged position as indicated in Fig. 5.
Figure 9:
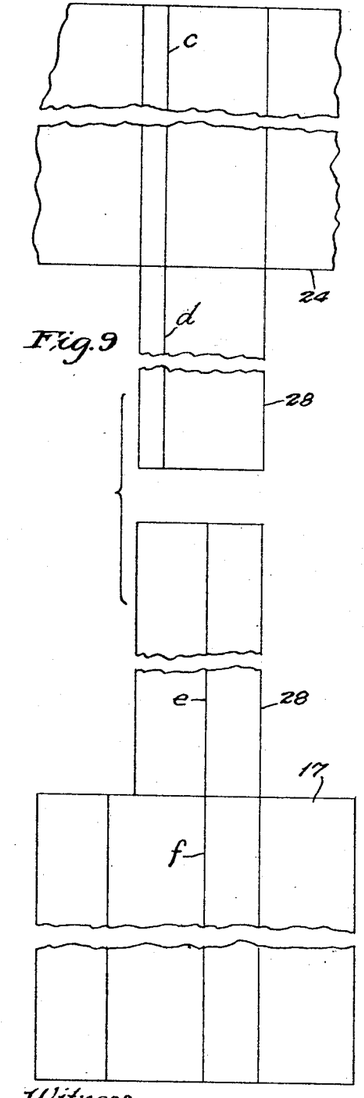
Fig. 9 is a fragmental diagrammatic development of the contact lines of shoe and strut at the outer end and of abutment and strut at the inner end of the strut diagrammed in Fig. 7, showing the relative positions of the contacting lines at the outer and inner ends of the strut in the released position of Fig. 7.
Figure 10:
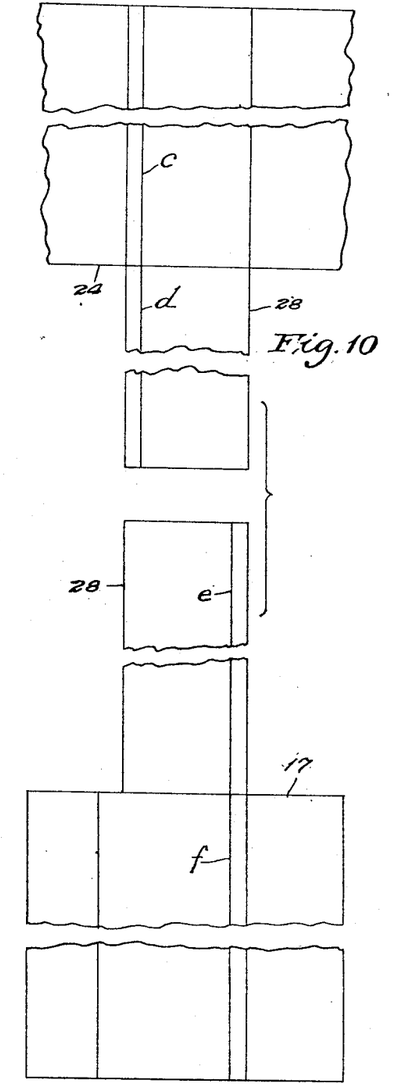
Fig. 10 is a view analogous to Fig. 9, showing the relative positions of the contacting lines of the strut, shoe and abutment when the parts are in the operative position ascribed to Fig. 8.

In Figs. 7 and 8, the projected lines $h\ g\ a$ and $h'\ g'\ a'$ drawn through the contacting lines 33 and 34 of the strut with its seats, indicate the respective lines of thrust through the strut for the two positions shown, while the lines $o\ a$ (Fig. 7) and $o'\ a'$ (Fig. 8) are normals to the friction surface of the annulus 5, drawn to intersect at $a$ and $a'$, the projected lines $h\ a$ and $h'\ a'$ respectively at said friction surface of annulus 5. The angles $o\ a\ h$ and $o'\ a'\ h'$ thus formed, may be taken to represent the angles of thrust for the two positions; and it will be noted that the angles $o\ a\ h$ and $o'\ a'\ h'$ are substantially the same. Likewise in Fig. 11, the angles $o\ a\ h$ and $o'\ a'\ h'$ similarly formed, are substantially the same.

For the purpose of this invention the angle of thrust herein referred to is defined as the angle occurring between a plane as $a\ h$, Fig. 7, extending through the contact points 33 and 34 and projected to intersect the rub face of the friction element or annulus 5 and a line, as $o\ a$, drawn normal to said rub face from such point of intersection. The point $o$ is considered to be the center of the annulus 5.

There is another angular force which I have indicated in Fig. 7 by a broken line drawn from P to P', the effect of which is negligible with a strut of comparatively thin proportions, but which is readily noticeable when the thickness of the strut materially exceeds the proportions noted above. This force P P' is produced by contact of the diagonally disposed edges of the struts with the corresponding sides $q$ of the strut seats; and its effect is to slightly increase the angle of thrust indicated by $o\ a\ h$ and $o'\ a'\ h'$. When struts are made with a substantially greater thickness than the proportions noted, the effect of the force P P' is to increase the indicated angle of thrust to such an extent as to cause the struts to fail to function except when the clutch is poorly lubricated, or to be too slow in functioning to produce the most effective results.

I have found that, in order to regulate the desired resistance to movement in the clutch by controlling the angle of thrust through the struts, the struts must be constructed with due relation to the co-efficient, or angle, of friction between the annulus and the brake shoes; that is to say, the angle of thrust in the strut should bear close relationship to the angle of friction. For leather friction facing and ordinary cup grease for lubrication, a strut having a greater angle of thrust than indicated in Fig. 11 would be inoperative under certain unfavorable conditions such as increased flow of lubrication under rising temperature. On the other hand, if it is desired to increase the resistance in the clutch, this may be accomplished without changes in lubrication or friction materials by employing a strut with a smaller angle of thrust, such as is indicated in Fig. 7.

In Fig. 12, the projected broken lines $h\ a$ and $o\ a$ correspond to similar lines in Figs. 7, 8 and 11 and the angle $h\ a\ o$ indicates the angle of thrust when the strut 28' is in fully engaged position. It will be seen that it is thus possible to predetermine the angle of thrust at the position where the strut is exerting its maximum pressure, and with a style of strut as at 28' used prior to my invention; and that this is accomplished by arranging the ways having side walls $r$, at one side of and parallel to a radial line, $o\ s$; and by thus providing a fixed stop at $r$ for preventing the strut from assuming a position in which the angle of thrust would approximate the angle of zero. While this structure will provide for requisite yielding, it is not so desirable as the other forms illustrated in that a comparatively long swing of the strut to the left from the position shown in Fig. 12 is required to effect a free release in the direction of free movement, and in that when the strut is in the released position, the angle of thrust is considerably greater than when in the engaged position; thus requiring as in former constructions the use of push springs behind the strut or the use of a combination producing a high co-efficient of friction in order to insure proper functioning.

It will be noted; that, due to the offsetting, or angular disposition of the curved ends relative to the axis of the struts, shown in Figs. 7, 8 and 11, the struts will be out of equilibrium in any position they may assume within the space allowed for oscillation. By reason of the unstable equilibrium features thus provided, the struts will fall back into an inoperative position as soon as the rotation of the annulus in the operative direction ceases; thereby relieving the vehicle springs of the damping effect produced by the clutch, and eliminating the possibility of the springs being bound down in a compressed position by the clutch.

It will be noted that the construction of my strut is such that maximum elongation or maximum shortening of the space between the contacting lines will occur with but slight movement of the strut. With the strut shown in Fig. 11, the oscillation will average about one-half of one degree. With the strut shown in Fig. 7, the movement is but slightly more. The limited oscillation thus produced has been found highly advantageous in that it imparts an almost instantaneous engaging and releasing action, thereby minimizing wear as well as doing away with lost motion, thus enabling the clutch to properly damp the small vibrations of the spring suspension which heretofore have been very annoying. It will also be noted that the tendency of my improved strut as shown in Figs. 7, 8 and 11, is to roll along the flat articulating surfaces of the shoe 24 and the abutment 17, rather than to rub or slide as would be the case if concave articulating seats are used as with the form illustrated in Fig. 12. This rolling action greatly minimizes wear and is therefore of importance in that the life of the strut and the parts with which it contacts is prolonged.

In Fig. 5, which shows the struts in engaged position, it will be noted that the struts are not in contact with positive stops such as have heretofore been necessary in clutches of this general class for governing the maximum swing of the struts and controlling the maximum separation of the shoe and support.

The elimination of the fixed stops is of advantage in several ways. It allows the struts to compensate for considerable wear without the necessity of manual adjustments by means of the adjusting bolt 20, and prevents an accumulation of lubricant on the friction surfaces by allowing the strut to sufficiently tighten to squeeze out any surplus lubricant from between the friction surfaces.

There is a tendency of the co-efficient of sliding friction to increase with pressure; such tendency varies more or less with the character of the frictional material and lubricant used. With combinations producing a relatively rapid increase of frictional co-efficient with increased pressure, it is advantageous to use contacting faces for the struts so curved as to produce a slightly increasing angle of thrust as the struts straighten with rotation of the annulus in the operative direction. My experience has been that, with suitable friction material and lubrication, the variation thus occurring in the co-efficient of sliding friction is not sufficient to require a great variation in the angle of thrust in order to prevent positive locking when the clutch is used as a spring damper. A close examination of the angles $o\,a\,h$ and $o'\,a'\,h'$ in Figs. 7, 8 and 11 will disclose that, while in each case the angles are substantially the same, the angle $o'\,a'\,h'$ is slightly greater than $o\,a\,h$. My experience is that this slight increase which, in this case is due to the changing angle of the seat 27 in the shoe 24, is sufficient to prevent positive locking due to increase in said co-efficient when the clutch is provided with suitable lubrication. If it is desirable to use but a scanty lubrication or a combination producing a greater increase of frictional co-efficient with increase of pressure; then, in order to obviate the possibility of the increasing co-efficient causing positive locking, it is advisable to depart somewhat from a substantially constant angle for the application of pressure, and to so shape the struts that the angles grow greater and the rate of separation between the support and the shoe is increased more rapidly as the struts move in the pressure producing direction.

While I do not confine the movements of my strut to positive limits by means of positive stops arranged for that purpose, I do, however, provide the pads 35 and 36 which may be made of felt, soft leather or some other suitable resilient material which serves to act as a sound deadener as the struts strike the sides of the ways. It is seldom that sufficient looseness occurs in the clutch to allow the struts to strike the pads 36 in the pressure producing movement; but on the reverse movement, the frictional drag between the annulus and the shoe will, even after the operative pressure has been relieved, cause the shoe to cling to the ring until the strut meets with some obstruction; and it is advantageous to provide means to check this movement of the strut without producing noise.

It will be noted that my invention does not depend on resilient members to insure proper yielding. As shown in the drawings the struts are of rigid construction; there are no springs in the brake shoes, and the shoes themselves closely parallel the curvature of the annulus. The friction leathers are preferably made from compressed sole leather, formed to the exact curvature of the annulus, and the pressure incident to use of such leathers in the clutch soon hardens them beyond the point where the resiliency of the leather could affect the working of the clutch. In fact, in this construction, resiliency is an undesirable feature, owing to the tendency of such resiliency to act in the nature of a soft pad in which the strut would tend to bury itself; thereby, in a measure, destroying the desirable unstable equilibrium feature of this strut.

The spacing between the friction facings 26 is not for the purpose of imparting resiliency to the brake shoes, but is required in order to prevent chattering which would occur in use, if the friction facing covered the entire shoe; and the space, as shown, is no greater than experience has indicated to be necessary for that purpose. This spacing also facilitates the application of the facings to the shoes, allows for a freer distribution of lubrication and for a readier conformance of the facings to the curvature of the annulus. While such spacing may increase the possibility of deflecting the brake shoes by great pressure, such deflection does not occur under the pressures requisite for proper spring damping where my sliding clutch is used as a shock absorber. It is recognized that it might be possible to distort the annulus by the application of unevenly distributed internal pressure; but such possibilities of deflection and distortion are not sufficient to supply such resiliency as would cause the clutch to offer the predetermined yielding resistance to movement; and such resiliency as might thus occur does not come within the meaning of this invention.

It will be seen that the strut is in the nature of a shore or prop and that, by this invention, I provide a construction in a sliding clutch using moving strut actuating means whereby the stress on the strut is limited by the angle of the forces through the strut; so that, when the predetermined stress is reached in the operation of the clutch, the continued tendency to operate the clutch is not effective to increase the stress.

This invention differs from the prior art in that, I have constructed a sliding clutch without the use of resilient devices, the resistance to movement in such clutch is limited by controlling the direction of forces through the actuating means, and the pressure on the brake face of the clutch is relieved upon cessation of movement of the actuating means.

I claim:

1. A shock absorber comprising a support, a member having a contact face movable relatively to the support, means to limit the width of the space between the contact face of said member and the support, a contact element engaging said contact face, and a non-circular moving strut adapted and arranged to hold the contact element in contact with such face; said strut being supported at one end by said support and having rolling contact thereon and with the contact element, the two lines of contact at the inner and outer ends of the strut, respectively, lying at all times in a plane, which plane, in all of its successive positions, makes substantially the same angle with the contact face of said member, and being adapted to produce pressure between the contact face and the contact element upon movement of the face in one direction relative to the support, and to relieve such pressure upon movement in the other direction.

2. A shock absorber comprising a support, a member having a contact face movable relative to the support; means to limit the width of the space between the contact face and the support; a contact element engaging such contact face; and a non-circular moving strut adapted to hold the contact element in contact with such face; said strut being supported at one end by said support and being adapted and arranged to apply varying degrees of pressure upon the contact element, at substantially the same angle of thrust.

3. A shock absorber comprising a support, a member having a contact face movable relative to the support, means to limit the width of the space between the contact face and the support, a contact element engaging the contact face and a moving strut adapted to continually hold the contact element in contact with the contact face; said strut being supported at one end by said support and being constructed and arranged to apply pressure between the contact face and the contact element during movement of the contact face in one direction and to relieve such pressure upon cessation of such movement.

4. In a shock absorber, in combination, relatively movable but non-separable members comprising a base and friction member, and a friction device for producing pressure to effect the requisite frictional resistance on one of the relative friction members, said device comprising a non-circular friction pawl constructed and arranged to operate between said base and the other of said relatively movable parts at a substantially constant angle of thrust throughout the space provided for movement of said pawl.

5. In a shock absorber comprising an annulus, a shoe and a support, a moving strut arranged between the support and the shoe and having rolling contact with both of these members, the lines of contact at the inner and outer ends of the strut, respectively, lying at all times in a plane, which plane, in all its successive positions, makes a constant angle with normals to the annulus from the lines of intersection of said plane with the annulus.

6. The combination with an annulus, a floating shoe contacting therewith and a support, of a wear compensating cam-faced moving strut operating between said support and floating shoe; said strut being supplied with substantially involute contact faces.

7. In a shock absorber, the combination with an annulus, a floating shoe contacting therewith and a support, of non-resilient wear compensating means operating between said support and floating shoe; said means consisting of a cam faced moving strut having substantially involute bearing faces and adapted to compensate for wear.

8. In a shock absorber, the combination with an annulus, a floating shoe and a support, of a cam faced moving strut operating between said support and floating shoe for producing pressure between the annulus and the shoe, said strut being supplied with substantially involute bearing faces.

9. A shock absorber comprising two relatively movable frictional elements, a support, a strut between the support and one of said elements to produce friction to yieldingly resist movement in one direction and to release upon reverse relative movement; and resilient stops at the sides of the strut.

10. A shock absorber comprising an inner support and an outer annulus having an internal friction face, a brake shoe for such face, and a moving strut contacting with said inner support and said brake shoe, the contacting surfaces of said strut being so designed that the contact point between said strut and the support, when the strut is transmitting maximum thrust, is at one side of the radius normal to the brake face and the friction face of the annulus, which radius is drawn to pass through the point of intersection of the frictional face of the annulus with a projection of a line connecting the respective contacting points on the ends of the strut.

11. A shock absorber comprising an inner support and an outer annulus having an internal friction face, a brake shoe for such face, and a moving strut contacting with said inner support and said brake shoe; the contacting surfaces of said strut being so designed that the contact point between said strut and the brake shoe, when the strut is transmitting maximum thrust, is at one side of the radius normal to the brake face and the frictional face of the annulus, said radius being drawn to the point of intersection of the frictional face of the annulus with a projection of a line connecting the respective bearing points on the ends of the struts.

12. In a shock absorber, the combination with an annulus and a central support, of a frictional surface in operative relation to the inside of the annulus, and a friction pawl and means whereby said pawl is set to operate at a substantially constant predetermined angle of thrust, the pawl being in constant engagement with said means and said support.

13. In a shock absorber, the combination with an annulus and a central support, of a non-resilient frictional element in operative relation to the inside of the annulus and a non-resilient friction pawl contacting with the friction element, said pawl being constructed and set to operate at a substantially constant angle of thrust, substantially as described.

14. A shock absorber comprising a support; a brake device having a smooth rub face, a device having a friction face to engage said rub face; and means for producing pressure to effect frictional resistance between said devices; said means comprising a moving strut set to operate at a predetermined angle of thrust; said angle of thrust being substantially the same as the angle of friction between the rub face and the friction face.

15. In a shock absorber the combination with shore struts, of a base having radial ways, an annulus surrounding the ways and rotatable relative to the base, brake shoes engaging the annulus and provided with notches to accommodate the outer ends of the struts and abutments in said ways; said abutments having notches arranged as companions to those of the brake shoes respectively to accommodate the inner ends of said struts; there being a strut seat formed by each notch; the bearing point for the strut in the seat of each brake shoe being on one side, and the bearing point for the strut in the seat of the companion abutment being on the other side of a line drawn radial to the base and the annulus and passing through the center of the strut; said struts being in the ways respectively and having their ends seated in said seats.

16. In a shock absorber, relatively movable friction parts, a base and a support; operative means consisting of a non-circular moving strut having pairs of bearing lines angularly disposed relative to a longitudinal median line through the strut, and being constructed and arranged to produce pressure at a substantially constant angle of thrust.

17. In a shock absorber of the character set forth, a moving strut having substantially involute bearing faces with the high points of said faces located on opposite sides of a median line drawn through the ends of the strut.

18. In a shock absorber of the character set forth, a moving strut having curved contact faces, the curves of said faces being angularly disposed to, and with the high points on opposite sides of, a median line through the strut and being constructed and arranged to apply pressure at a substantially constant angle of thrust and relatively movable but non-separable elements upon which the thrust of the strut is applied.

19. In a shock absorber of the character set forth, a moving strut having curved contact faces, the curves of said faces being produced from different centers located respectively on opposite sides of a line in the same plane with the curves and substantially in the center of the strut; the radii for said curves being of such lengths that the projection of the curve for one of said faces will not form a closed curve with the other of said faces, and relatively movable elements between and upon which the thrust of the strut is applied.

20. In a shock absorber comprising an annulus and using moving strut actuating means, a strut constructed and arranged with the inner and outer contact points for the ends thereof lying on opposite sides of a line drawn normal to the annulus and passing through the center of said strut; throughout the allowable movement of the strut, and relatively movable faces between and on which the strut operates; said strut operating at a substantially constant angle of thrust, said angle being substantially equal to the angle of friction for the frictional faces of said clutch.

21. A shock absorber comprising an inner support and an outer annulus having an internal frictional face, a brake shoe for such face, and a moving strut contacting with said inner support and said brake shoe; the contact point between said strut and the support and the contact point between said strut and the brake shoe, when both the outer and inner points have reached a position of maximum effectiveness, being on opposite sides of a line drawn normal to the brake face and passing through the center of said strut; the angle of thrust for said strut, when such position of maximum effectiveness has been reached, being substantially equal to the angle of static friction between said internal face and said brake shoe.

22. A shock absorber comprising an annular ring and a floating shoe contacting therewith and a support and means for creating an outward radial movement of said shoe and consequent frictional resistance between the shoe and the ring, said means being constructed and arranged with successive pairs of contacting lines for the bearing ends thereof, said pairs lying in successive planes angularly disposed in relation to normals to said ring, said normals being drawn to the points of intersection of projections of said planes with said ring, the angle between said normals and said planes remaining constant with further circumferential movement of the shoes as they tend to follow the ring.

23. In a shock absorber, the combination with an element constituting an annular shell; of a radially slotted, centrally chambered base; non-resilient shoes to engage the shell; a triangularly shaped member having flat tapered sides in the central chamber of the base; abutments in the slots; and non-resilient moving strut means between the abutments and the shoes; said base being provided with lugs; and stops retained by said lugs for limiting the movement of the moving strut means.

24. In a shock absorber adapted to control the reaction of vehicle springs and comprising a brake face, a rub face and a support the brake face and support being non-separable; a non-circular friction pawl constructed and arranged to produce pressure between said faces at a substantially constant angle of thrust.

25. In a shock absorber, the combination with moving struts, of a base having radial ways, supports for the struts, abutments for the supports, an annulus surrounding the ways and rotatable relative to the ways, means to regulate the space between the annulus and the supports, and brake shoes engaging the annulus; said shoes and supports being fitted with flat articulating surfaces for the bearing ends of the said struts.

26. In a shock absorber, the combination with moving struts; of a base having radial ways, supports for the struts, an abutment for the supports, an annulus surrounding the ways, means to regulate the space between the annulus and the supports, and brake shoes engaging the annulus; said supports being fitted with flat articulating surfaces for the inner ends of the struts.

27. In a shock absorber employing non-resilient means for governing the amount of frictional resistance therein, the combination with a support and a relatively movable friction element, and means to prevent separation of said support and element in operation of the clutch, of a non-circular friction pawl adapted to apply pressure to the friction element, the support being provided with a flat surface for the articulation of said strut.

28. A shock absorber comprising a friction face, a support and non-resilient means for producing pressure upon said face, said means being constructed and arranged to produce increased pressure upon movement of the face in one direction only and to relieve such increase of pressure upon cessation of such movement.

29. In a shock absorber, in combination, a brake face, a support, means to prevent separation of the brake face and support, and a device to effect frictional resistance on the brake face comprising a non-circular moving strut and articulating seats therefor, said means being constructed and arranged to produce a substantially constant angle of thrust in the strut throughout the space provided for the movement of said strut.

30. In a shock absorber of the character set forth, having a contact face, a brake face and a support, a strut having a substantially involute contact face whereby a constantly increasing rate of separation between the brake face and the support throughout the entire allowable movement of the strut is realized.

31. In a shock absorber, the combination with moving struts of a base having radial ways, supports for the struts, an abutment for the supports, an annulus surrounding the ways and rotatable relative to the ways, means to regulate the space between the annulus and the supports and non-resilient brake shoes engaging the annulus; said brake shoes being fitted with rub faces spaced apart on said shoes.

32. In a shock absorber, two relatively rotatable members, radially movable non-resilient brake shoes, said shoes being fitted with rub faces spaced apart; and moving strut means operable by relative rotation of said members to move said shoes radially to frictionally engage one of said members.

33. In a shock absorber, two relatively movable members, a non-resilient floating shoe arranged between the members, and frictionally engaging one of the members, said shoe being fitted with rub faces spaced apart on said shoe; and means including a moving strut, arranged between the shoe and the other member, and operable by relative movement of said members, to force the shoe with yielding pressure against the member with which the shoe engages.

34. In a shock absorber using friction pawl actuating means, a non-resilient brake shoe fitted with a plurality of rub faces spaced apart at the center of said shoe and projecting from the same to take the entire wear on the shoe, the line of thrust of the friction pawl on the shoe passing between said faces.

35. In a shock absorber, two relatively rotatable members, radially movable non-resilient brake shoes, radially adjustable non-resilient moving strut means operable by relative rotation of said members to move said shoes radially to frictionally engage one of said members and means to adjust said radially adjustable means.

36. A shock absorber comprising two members relatively rotatable about a common axis, means interposed between said members for retarding such relative rotation in one direction including a brake shoe and a non-circular friction pawl in direct contact therewith, both non-resilient and transmitting directly the full thrust of the brake shoe to one of said members, and means to prevent separation of said members due to such thrust.

37. In a shock absorber, in combination, two relatively movable but non-separable members, and means for frictionally retarding the movement of one of said members relatively to the second, comprising a non-resilient brake shoe and a non-resilient oscillatable strut having constant engagement with the brake shoe and said second member, the movement of the strut being unconfined on the resistance producing direction.

38. A shock absorber comprising two relatively rotatable members, one or more non-resilient floating shoes, non-resilient means operable by the relative rotation of the said members to force the shoe or shoes into engagement with one of said members, and non-resilient means to control said operable means to increase or decrease the force with which said shoe is operated, said means consisting of such an arrangement of successive bearing points for said strut as will cause said strut to operate at a predetermined angle of thrust, substantially as described.

In testimony whereof, I have hereunto set my hand at Los Angeles, California, this 15th day of July, 1918.

JAMES PIERCE BALDWIN.

Witness:
JAMES R. TOWNSEND.